United States Patent [19]

Chmiel et al.

[11] Patent Number: 5,674,549
[45] Date of Patent: Oct. 7, 1997

[54] FOOD MICROEMULSION FORMULATIONS

[75] Inventors: Oliver Chmiel, Orbe; Helmut Traitler, Corseaux, both of Switzerland; Kai Voepel, Brecksville, Conn.

[73] Assignee: Nestec S.A., Vevey, Switzerland

[21] Appl. No.: 603,002

[22] Filed: Feb. 16, 1996

Related U.S. Application Data

[63] Continuation-in-part of Ser. No. 382,329, Feb. 1, 1995, abandoned.

[51] Int. Cl.⁶ ........................................... A23D 7/00
[52] U.S. Cl. ............................... 426/602; 426/651
[58] Field of Search ............................ 426/604, 609, 426/417, 650, 651, 602, 601, 611, 612

[56] References Cited

U.S. PATENT DOCUMENTS

| | | | |
|---|---|---|---|
| 2,929,716 | 3/1960 | Barch et al. | 99/71 |
| 3,266,904 | 8/1966 | Jan Duen | 426/604 |
| 3,917,858 | 11/1975 | Bos | 426/594 |
| 4,414,229 | 11/1983 | Bakal | 426/613 |
| 4,528,201 | 7/1985 | Purves | 426/601 |
| 4,544,567 | 10/1985 | Gottesman | 426/594 |
| 4,835,002 | 5/1989 | Wolf et al. | 426/590 |
| 4,906,490 | 3/1990 | Bakal | 426/613 |
| 4,996,072 | 2/1991 | Marschner | 426/417 |
| 5,045,337 | 9/1991 | El-Nokaly | 426/601 |
| 5,079,028 | 1/1992 | Wieske | 426/604 |
| 5,202,146 | 4/1993 | Singer | 426/613 |
| 5,283,056 | 2/1994 | Chung | 426/650 |
| 5,496,574 | 3/1996 | Rushmore et al. | 426/98 |

FOREIGN PATENT DOCUMENTS

| | | |
|---|---|---|
| 0 008 015 | 7/1979 | European Pat. Off. . |
| 0 623 287 A1 | 4/1994 | European Pat. Off. . |

OTHER PUBLICATIONS

Patton 1976 Biomedical Aspects of Lactation Pergamon Press New York p. 78.

*Primary Examiner*—Carolyn Paden
*Attorney, Agent, or Firm*—Pennie & Edmonds

[57] ABSTRACT

An emulsion preconcentrate which contains a hydrolyzed fat and an aroma or flavor. The emulsion preconcentrate is included in frozen or chilled food products. Upon heating of the food product to above the melting point of the hydrolyzed fat, the emulsion preconcentrate spontaneously forms an emulsion having microemulsion characteristics with aqueous media in the food product to rapidly release the aroma or flavor.

19 Claims, No Drawings

FOOD MICROEMULSION FORMULATIONS

CROSS-REFERENCE TO RELATED APPLICATIONS

This application is a continuation-in-part of application Ser. No. 08/382,329 filed Feb. 1, 1995, now abandoned.

FIELD OF THE INVENTION

This invention relates to a formulation for use in food which, when mixed with an aqueous medium and heated, is capable of spontaneously forming an emulsion and releasing a functional substance. The invention also relates to a food product which contains the formulation.

BACKGROUND TO THE INVENTION

It is often desirable to incorporate functional substances, such as flavorants, aromas, and the like, in foods. For example, consumer perception of a food product is often significantly improved if the product gives off pleasant aroma while cooking or on the table. However many convenience foods which need only be re-heated by the consumer often give off reduced amounts of aroma; if at all. The problem is particularly acute with foods heated in a microwave oven since heating times are not long enough and temperatures are not high enough for flavors and aromas to develop.

Unfortunately, incorporation of functional substances into foods is often problematic. In particular, it is difficult to provide a stable formulation which also readily releases the functional substance when desired. Either the formulation is not stable enough or it is too stable and does not release the functional substance when desired. These problems often become more acute if the functional substance is not soluble in the chosen carrier medium. Also, many functional substances are in the form of precursors which are soluble in one medium as precursors but are soluble in another medium in operative form. Usually it is not possible to simply mix the various substances since the resulting formulations are not sufficiently stable. These stability problems become even more acute with volatile substances like aromas.

To deal with these problems and other problems, much emphasis has been placed in recent times on microemulsions since these formulations are thermodynamically stable. For example, the formulation of flavorants into microemulsions has been suggested in U.S. Pat. No. 4,835,002. However the microemulsions described in this patent require the use of surfactants and alcohols in order for them to form. However the present trend is to reduce the use of these sorts of ingredients in foodstuffs; if at all possible.

Another microemulsion formulation is described in U.S. Pat. No. 5,045,337. Here the aqueous phase, which comprises up to 5% by weight of the emulsion, is formulated as the dispersed phase of a microemulsion. The surfactant which is used to form the microemulsion is a polyglycerol mono, diester of an unsaturated or branched chain fatty acid having from 12 to 24 carbon atoms, esterified with a polyglycerol consisting of up to 30% diglycerol, 30 to 50% triglycerol, 15 to 50% tetraglycerol, and up to 10% mono and other polyglycerols. The main advantage of these microemulsions is much reduced surfactant content. Although these microemulsions provide an effective solution in some instances, a surfactant still must be used.

Therefore there is still a need for a system for incorporating functional substances into food products which does not require the use of added surfactant.

SUMMARY OF THE INVENTION

In one aspect, this invention provides an emulsion preconcentrate comprising a hydrolyzed fat containing at least 10% by weight free fatty acids of which at least 90% by weight have 12 or more carbon atoms; and a functional aromatizing substance captured in the hydrolyzed fat;

the emulsion preconcentrate spontaneously forming an emulsion including droplets of dispersed phase of size less than 200 nm upon admixture with water at a temperature higher than the melting point of the hydrolyzed fat.

Surprisingly fats, once hydrolyzed to long chain fatty acids are able, at least partially, to spontaneously form emulsions, in the presence of water and at temperatures above the melting point of the fat, which have characteristics of a microemulsion. However, unlike prior microemulsions, added surfactant is not required. This is a substantial advantage.

For the avoidance of doubt, a microemulsion is a thermodynamically stable, clear liquid which forms spontaneously upon addition of its components and which contains a lipid phase and an aqueous phase. Further the droplets of the dispersed phase have a droplet size less than 200 nm; and preferably less than 100 nm. A microemulsion is different from a normal emulsion in that normal emulsions have droplet sizes in the micron range, are not clear, are not thermodynamically stable, and do not form spontaneously. Further, in a microemulsion, because the droplets of the dispersed phase are very small, the surface area of the dispersed phase, and hence the surface area for functional substance release, is very large. Thus, upon dissolution in water at a temperature above the melting point of the hydrolyzed fat, the preconcentrate releases a burst of the functional substance; a very significant advantage.

Further, without wishing to be bound by theory, in a microemulsion it is believed that the droplets of the dispersed phase constantly form and reform. This further permits rapid release of the functional substance. However, prior to the formation of the microemulsion, the functional substance is captured in the preconcentrate in a stable manner.

The fat which is hydrolyzed may be a natural or fractionated natural fat, or such a fat which has been subjected to selected and directed interesterification.

Preferably the hydrolyzed fat contains at least 10% by weight free fatty acids; and even more preferably at least 20% by weight free fatty acids. For example, the content of free fatty acids in the hydrolyzed fat may be in the range of about 50% to 90% by weight; preferably 70% to 85% by weight.

It is also preferred for the hydrolyzed fat to have a melting point above about 15° C.; for example about 30° to 40° C. With a melting point at these temperatures, the hydrolyzed fat is solid at room temperature leading to better entrapment of the functional substance in the emulsion preconcentrate. However for frozen or chilled applications, hydrolyzed fats having lower melting points are acceptable.

Preferably, about 95% to about 99% by weight of the free fatty acids have at least 12 carbon atoms; more preferably at least 14 carbon atoms. More preferably the free fatty acids comprise 95% to about 99% by weight of $C_{14}$–$C_{20}$ free fatty acids. Hydrolyzed oils having free fatty acid profiles of this nature are preferably produced by chemical or physical hydrolysis processes.

The emulsion preconcentrate may further comprise up to 10% by weight of an aqueous medium. This is particularly advantageous when the functional substance is water soluble and not oil soluble. Preferably, however, the preconcentrate contains less than 2% by weight of the aqueous medium.

Preferably the functional substance comprises less than 10% by weight of the preconcentrate; more preferably from 0.01% to 2% by weight.

The function substance may be selected from an aroma, a flavorant, a precursor of an aroma or flavorant, or mixtures thereof. Other functional substances such as vitamins, salts, minerals, antioxidants, and the like may also be included. Conveniently, the functional substance is a volatile aroma or precursor thereof, which is released upon the formation of a microemulsion.

In another aspect, this invention provides a food product incorporating an emulsion preconcentrate as defined above. If necessary, the food product may contain additional aqueous phase sufficient to form an emulsion upon heating of the product to a temperature above the melting point of the hydrolyzed fat.

Preferably, the food product is frozen or chilled.

The microemulsion preconcentrate preferably comprises from 0.05% to 5% by weight of the food product; more preferably 0.1 to 2% by weight. For example, the microemulsion preconcentrate may comprise 0.2 to 0.6% by weight of the food product.

The food product has the significant advantage that, upon heating (for example in a microwave oven) to a temperature above the melting point of the fat, the preconcentrate combines with any aqueous medium in the food to spontaneously form an emulsion which contains droplets of dispersed phase in the microemulsion range. A rapid release of flavor or aroma then results.

DETAILED DESCRIPTION OF THE INVENTION

Embodiments of the invention are now described, by way of example only. In this specification, an "emulsion preconcentrate" is a lipid medium which, when mixed with an aqueous medium at a temperature sufficiently high for the lipid medium to be liquid, is capable of self emulsifying to spontaneously form an emulsion; either water-in-oil or oil-in-water, which includes droplets of dispersed phase in the microemulsion range. It is possible that minor amounts of the dispersed phase may, for various reasons, form larger droplets than would fall within the definition of a microemulsion but these droplets are relatively stable; at least at neutral pH. If the lipid medium is the dispersed phase, it may contain minor amounts of an aqueous phase dispersed in it.

The microemulsion preconcentrate is produced by first hydrolyzing a fat. The source and the exact composition of the fat used is not critical; primarily the fat will be selected for desired taste characteristics, compatibility, or for stability. For example, the fat may be a natural oil or fat of vegetable, animal, or marine origin. Specific examples of suitable fats include sunflower oil, soybean oil, maize oil, safflower oil, rapeseed oil, cottonseed oil, peanut oil, olive oil, cocoa butter, butter fat, fish oils, chicken fat, pork fat, tallow, beef fat, shortening, mixtures thereof, and the like. Alternatively the fat may be a fraction obtained from these natural oils and fats by conventional fractionation techniques; or may be a natural or fractionated fat which has been subjected to selected and directed interesterification. Suitable synthetic fats may also be used but they will usually be too expensive.

The oil may be hydrolyzed by any suitable hydrolysis procedure; particularly chemical or physical. Enzymatic processes are in general unsuitable since larger quantities of small free fatty acids are produced. These may adversely affect the flavor and aroma of the hydrolyzed oil since they impart a rancid smell.

In one example of a suitable process, the oil may be subjected to alkaline hydrolysis in a manner similar to conventional saponification processes for fats and oils. The alkaline used in the procedure may be any suitable alkaline but alkaline based upon alkali and alkali earth metal hydroxides are preferred since the residues of these acids are often acceptable in foods. The alkali metal hydroxides NaOH and KOH are particularly preferred. The hydrolysis may be terminated in a conventional manner; for example by adding an acid. Again the acid used is best selected from acids of which the residues are food grade. For example, HCl may be used. This procedure gives particularly good results with high conversion of the oil into free fatty acids; for example up to about 80%.

Alternatively, the oil may be subjected to steam stripping at temperatures in the range of about 90° C. to about 210° C. Such a process may be carried out in a high pressure reactor using direct injection of steam at high pressure. This procedure has the advantage that trace elements are not added to the oil during hydrolysis but the extent of hydrolysis may be lower; for example around 20 to 25%.

Another procedure for hydrolyzing the oil is to react the oil with between 5 to 20% by weight water in a sealed reactor. Reaction temperatures in the range of about 175° C. to 260° C. may be used. Reaction times of about 30 minutes to 2 hours are suitable. Particularly good results are obtained with about 10% by weight water reacted at 245° C. for 1 hour. Usually the hydrolysis is terminated by allowing the reaction mixture to cool. This procedure also has the advantage that trace elements are not added to the oil. However, the procedure has the further advantage that high levels of free fatty acids are readily obtainable; for example up to 80%.

It will be appreciated that the hydrolyzed fats produced by these processes are unlikely to be completely hydrolyzed in that amounts of mono-, di- and/or triglycerides will be present in the product hydrolyzed oil. If desired these glycerides may be removed by conventional separation techniques but this is not necessary. Therefore it is to be understood that in this specification, the term "hydrolyzed fat" includes a fat which has been partially hydrolyzed and thus contains amounts of mono-, di- and/or triglycerides; for example from about 5% to about 90% by weight mono-, di- and/or triglycerides. The hydrolyzed oils so produced usually have a melting point above about 30° C. and therefore they are solid at room temperature. This has the advantage of better entrapment of the functional substance in the hydrolyzed oil; providing some improvement in functional substance retention during storage.

Once the oil has been hydrolyzed, the functional substance must be incorporated into it to form the preconcentrate. Any desired functional substance may be incorporated. If it is oil soluble or miscible, the functional substance may be simply mixed with the hydrolyzed oil; for example in a ribbon blender. Heating of the hydrolyzed oil to its melting point may be required. Or the functional substance may be mixed in a suitable carrier oil and the carrier oil mixed with the hydrolyzed oil. The carrier oil may be of the same source as the hydrolyzed oil, but being unhydrolyzed. Alternatively, for water soluble substances, the function substance may be dissolved in a small amount of water and the water mixed with the hydrolyzed oil as a dispersed phase. Alternatively, the functional substance may be absorbed into the hydrolyzed oil; this procedure being particularly suitable for gaseous aromas.

Conveniently the functional substance is a flavor or aroma, or a precursor of a flavor or aroma, or mixtures thereof. Any suitable aromas and flavors, be they natural or synthetic, may be used as desired. Examples are fruit flavors and aromas, herb flavors and aromas, meat or animal fat flavors aromas, and the like. Further functional substances such as nutrients; for example vitamins, trace minerals and the like, salts, sugars, preservatives, and the like may also be incorporated.

Then the emulsion preconcentrate is applied to a food product. The food product may be any suitable food product as desired and the emulsion preconcentrate may be mixed in using any suitable procedure. The emulsion preconcentrates, however, are particularly useful in frozen or chilled convenience foods. For example, the preconcentrates may be added to frozen dinners or may be used in frozen pizzas, frozen sweet and sour dishes, breads, frozen French fries, frozen deserts and pies, and the like. The preconcentrate may be sprayed on the food product, may be mixed in the food product, mixed in sauces forming part of the food product, and the like. If the food product does not naturally contain sufficient aqueous phase to form an emulsion, water may be added to the food product. Particularly if the food product is frozen, the small amounts of additional water should not caused any significant problem.

In use, the user merely heats the food product; for example in a microwave oven or a convection oven. Once heated, the hydrolyzed fat in the emulsion preconcentrate melts and spontaneously forms an emulsion with aqueous phase present in the food product; the droplets of the dispersed phase including droplets of size below about 200 nm. These very fine droplets are stable but not visible to the eye. The functional ingredient in these droplets is released rapidly because of the very large surface area of the dispersed phase and as the droplets constantly reform. Then, for example, if the functional ingredient is an aroma, the user perceives a burst of aroma.

That this can be achieved in a microwave oven is particularly surprising. Usually foods re-heated or cooked in a microwave oven are not subjected to high enough temperatures and long enough cooking times for flavors and aroma to develop. Consequently most frozen foods heated in a microwave oven give off no substantial amounts of aromas. However food heated or cooked in a microwave is likely to be heated to a temperature at least above the melting point of the hydrolyzed fat. Hence if the food contains the emulsion preconcentrate, aromas and flavors will be released rapidly in a burst.

To further illustrate the invention, the following examples are given:

EXAMPLE 1

Pressure and Temperatures Hydrolysis of Butter Fat and Chicken Fat

Two reaction mixtures are made up; one of a sample of butter fat (Land O'Lake butter obtained from a local supermarket) and the other of a sample of chicken fat (again obtained from a local supermarket). Water is added to each reaction mixture to make up 90% by weight of the mixture. Each mixture is degassed under vacuum and placed in a Parr bomb and the bomb heated to 246° C. for 60 minutes. Each bomb is placed in an ice bath to terminate hydrolysis. Each bomb is allowed to depressurize and is opened. Once the oil has solidified, the aqueous phase is discarded. In each case, the hydrolyzed oil has a melting point in the range of 30° to 40° C.

A sample of 20 µg of each hydrolyzed oil is dissolved in 20 µl of a 2:1 chloroform:hexane mixture and then applied on a HPTLC plate (silica gel 60 F 254 obtained from Merck GmbH, Darmstadt, Germany) using capillaries. The plates are then subjected to HPTLC analysis using the two-stage development technique described in Jork et al; 1989; *Dünnschicht-Chromatogaphie*, Band 1a, Merck, VCH, Weinheim, Germany, pages 327 to 330. The composition of the neutral lipids is then determined by titration or gas chromatography. The free fatty acid content is about 80%. Greater than 96% by weight of the free fatty acids have 14 to 20 carbon atoms; free fatty acids having 16 and 18 carbon atoms providing the bulk of the free fatty acids.

100 ml of water at pH 7 is held at a temperature of about 60° C. 20 mg of the hydrolyzed oil is added to the water. A slightly turbid emulsion spontaneously forms. The emulsion is subjected to droplet size analysis and the mean droplet size is determined to be about 290 nm; including droplets of size less than 200 nm (for example about 50 nm). Small amounts of very fine droplets of oil are detected on the surface of the water. The emulsion is inspected a week later and is found to be stable. These results indicate the presence of a microemulsion; along with stable droplets having a size outside of the microemulsion range.

EXAMPLE 2

Alkaline Hydrolysis of Butter Fat and Chicken Fat

The butter fat and chicken fat of example 1 are used. A 600 ml sample of each fat is placed in a reaction vessel in a water bath at 70° C. An aliquot of 200 ml of 2N KOH is added to each sample and the mixture incubated for 2 hours at 70° C. The reaction is stopped by adding 70 ml of 6N HCl.

Upon addition of the HCl, the mixture separates into an aqueous phase and an oil phase, the latter solidifying with cooling. Upon solidification of the oil phase, the aqueous phase is discarded leaving the hydrolyzed oils. The melting point of each hydrolyzed oil is determined to be in the range of 40° to 55° C.

The free fatty acid content of each hydrolyzed oil is determined as described in example 1. The hydrolyzed fats contain about 80 to 85% by weight of free fatty acids. Greater than 96% by weight of the free fatty acids have 14 to 20 carbon atoms.

Each hydrolyzed oil is added to hot water as described in example 1 and subjected to droplet size analysis. The emulsion includes droplets of size less than 200 nm. Small amounts of very fine droplets of oil are detected on the surface of the water. The emulsion is inspected a week later and is found to be stable. These results indicate the presence of a microemulsion; along with stable droplets having a size outside of the microemulsion range.

EXAMPLE 3

Steam Hydrolysis of Butter Fat and Chicken Fat 500 g of each of the butter fat and chicken fat of example 1 is loaded into a separate 1.5 liter high pressure bomb (Pressure Products Industries, Inc., Warminster, Pa., USA). Steam at 2070 kPa (300 psi) is directly injected into each pressure bomb to provide a reaction temperature of 204° C. (400° F.). The contents are held at the reaction temperature for about 1 minute. Then the pressure is released and the hydrolyzed oil removed. The hydrolyzed oil has a melting point of about 40° C. and a free fatty acid content of about 25%. Greater than 96% by weight of the free fatty acids have 14 to 20 carbon atoms.

Each hydrolyzed oil is added to hot water as described in example 1 and subjected to droplet size analysis. The emulsion includes droplets of size less than 200 nm. Small amounts of very fine droplets of oil are detected on the surface of the water. The emulsion is inspected a week later and is found to be stable. These results indicate the presence of a microemulsion; along with stable droplets having a size outside of the microemulsion range.

EXAMPLE 4

Hydrolysis of Butter Fat and Chicken Shortening

Crisco Chicken shortening and O'Dells butter fat are obtained commercially and hydrolyzed as described in example 1. Each hydrolyzed oil is added to hot water as described in example 1 and subjected to droplet size analysis. The emulsion includes droplets of size less than 200 nm. Small amounts of very fine droplets of oil are detected on the surface of the water. The emulsion is inspected a week later and is found to be stable. These results indicate the presence of a microemulsion; along with stable droplets having a size outside of the microemulsion range.

A chicken aroma is mixed into the hydrolyzed chicken shortening. The mixture is comminuted and added to a Lean Cuisine sweet and sour frozen chicken dinner. The dinner is placed in a microwave oven and heated as directed on the package. The chicken dinner has a strong chicken aroma.

A garlic aroma/flavor is mixed into the hydrolyzed butter fat. The mixture is comminuted and placed into french bread. Butter is also added. The bread is frozen and then re-heated in a microwave oven. The bread has a strong garlic flavor.

EXAMPLE 5

Frozen Pizza Product

A frozen Lean Cuisine French bread pizza and a Stouffer French bread pizza is obtained from a local supermarket. A small amount of water is sprayed on each pizza and the pizzas returned to the freezer to freeze the water. Hydrolyzed chicken fat produced as described in example 1 is heated to above its melting point. A cooked chicken aroma is mixed into the hydrolyzed chicken fat. The hydrolyzed chicken fat is then sprayed on the pizzas. The pizzas are returned to the freezer. After 1 hour, the pizzas are placed in a microwave oven and heated as conventional. The pizzas have a strong chicken aroma.

For comparison, an untreated frozen pizza is heated in the microwave oven for the same time and under the same conditions. The cooked pizza has little aroma.

In the production of a frozen pizza, the microemulsion preconcentrate may also be sprayed onto the base prior to addition of the topping.

EXAMPLE 6

Frozen Chicken Dinners

Several frozen chicken dinners (Stouffer's Lean Cuisine Chicken Fettucini, Glazed Chicken, Chicken in Peanut Sauce, Chicken Chow Mein, Chicken Sweet and Sour, Chicken Marsala, and Teriyaki Chicken) are obtained from a local supermarket. Hydrolyzed chicken fat produced as described in example 1 is heated to above its melting point. Cooked chicken aroma is mixed into the hydrolyzed chicken fat. The hydrolyzed chicken fat is then sprayed on each chicken dinner. The chicken dinner is returned to the freezer. After 1 hour, each chicken dinner is placed in a microwave oven and heated as directed on the package. The chicken aroma from each dinner is then evaluated by a test panel:

| Dinner | Aroma Intensity |
| --- | --- |
| Chicken Fettucini | ++ |
| Glazed Chicken | + |
| Chicken in Peanut Sauce | + |
| Chicken Chow Mein | +++ |
| Chicken Sweet and Sour | +++ |
| Chicken Marsala | + |
| Teriyaki Chicken | +++ |

"–" indicates no aroma and "+++" indicates very intense aroma.

For comparison, an untreated Teriyaki Chicken dinner is heated in the microwave oven for the same time and under the same conditions. The cooked chicken dinner has almost no chicken aroma; equivalent to "–".

In the production of a frozen dinner, the microemulsion preconcentrate may also be dispersed within the sauce.

We claim:

1. An emulsion preconcentrate comprising:
    a hydrolyzed fat containing at least about 10% by weight free fatty acids of which at least 90% by weight have at least 12 carbon atoms; and
    a functional aromatizing substance captured in the hydrolyzed fat, the functional aromatizing substance being selected from an aroma, a flavorant, a precursor of an aroma or flavorant, or mixtures thereof, and
    the emulsion preconcentrate spontaneously forming an emulsion including droplets of dispersed phase of size less than 200 nm upon admixture with water at a temperature higher than the melting point of the hydrolyzed fat.

2. An emulsion preconcentrate according to claim 1 in which the fat which is hydrolyzed is a natural or fractionated natural fat, or such a fat which has been subjected to selected and directed interesterification.

3. An emulsion preconcentrate according to claim 1 in which the hydrolyzed fat is a chemically or physically hydrolyzed fat.

4. An emulsion preconcentrate according to claim 1 in which the hydrolyzed fat contains from about 50% to 90% by weight free fatty acids.

5. An emulsion preconcentrate according to claim 1 in which the hydrolyzed fat has a melting point of about 15° to 40° C.

6. An emulsion preconcentrate according to claim 1 which further comprises up to 10% by weight of an aqueous medium.

7. An emulsion preconcentrate according to claim 1 in which the functional substance comprises from 0.01% to 2% by weight of the preconcentrate.

8. An emulsion preconcentrate according to claim 1 in which about 95% to about 99% by weight of the free fatty acids have at least 12 carbon atoms.

9. An emulsion preconcentrate according to claim 1 in which the preconcentrate is a lipid phase.

10. A method for imparting an aroma or a flavor to food product which comprises applying to a food product an emulsion preconcentrate according to claim 1, which emulsion preconcentrate has been admixed with water at a temperature higher than the melting point of the hydrolyzed fat.

11. A food product which includes an emulsion preconcentrate comprising:

a hydrolyzed fat containing at least 10% by weight free fatty acids of which at least 90% by weight have at least 12 carbon atoms; and a functional aromatizing substance captured in the hydrolyzed fat, the functional aromatizing substance being selected from an aroma, a flavorant, a precursor of an aroma or flavorant, or mixtures thereof, and the emulsion preconcentrate spontaneously forming an emulsion including droplets of dispersed phase of size less than 200 nm upon admixture with water at a temperature higher than the melting point of the hydrolyzed fat.

12. A food product according to claim 11 in which the emulsion preconcentrate comprises from 0.05 to 2% by weight of the food product.

13. A food product according to claim 11 in which the fat which is hydrolyzed is a natural or fractionated natural fat, or such a fat which has been subjected to selected and directed interesterification.

14. A food product according to claim 11 in which the hydrolyzed fat contains from about 50% to 90% by weight free fatty acids.

15. A food product according to claim 11 in which the hydrolyzed fat has a melting point of about 15° to 40° C.

16. An emulsion preconcentrate according to claim 11 in which about 95% to about 99% by weight of the free fatty acids have at least 12 carbon atoms.

17. An emulsion preconcentrate according to claim 11 in which the hydrolyzed fat is a chemically or physically hydrolyzed fat.

18. A food product according to claim 11 in which the preconcentrate is a lipid phase.

19. A food product which includes an aqueous medium and 0.05 to 2% by weight of a mixture of a hydrolyzed natural or fractionated natural fat and a functional aromatizing substance captured in the hydrolyzed fat, the functional aromatizing substance being selected from an aroma, a flavorant, a precursor of an aroma or flavorant, or mixtures thereof, the hydrolyzed fat comprising from about 50% to 90% by weight free fatty acids of which about 95% to about 99% by weight have at least 12 carbon atoms, and the aqueous medium and the emulsion preconcentrate spontaneously forming a stable emulsion for causing the food product to release the functional aromatizing substance upon heating of the food product to above the melting point of the hydrolyzed fat.

* * * * *